(12) United States Patent
Orita et al.

(10) Patent No.: US 8,500,881 B2
(45) Date of Patent: Aug. 6, 2013

(54) CARBON DIOXIDE CAPTURE POWER GENERATION SYSTEM

(75) Inventors: Hisayuki Orita, Hitachinaka (JP);
Masaaki Mukaide, Hitachinaka (JP);
Nobuyuki Hokari, Hitachinaka (JP);
Tsuyoshi Shibata, Hitachiota (JP);
Masayuki Taniguchi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 12/859,482

(22) Filed: Aug. 19, 2010

(65) Prior Publication Data
US 2011/0076216 A1    Mar. 31, 2011

(30) Foreign Application Priority Data
Sep. 30, 2009 (JP) .................................. 2009-225921

(51) Int. Cl.
*B01D 53/02* (2006.01)
*B01D 53/50* (2006.01)

(52) U.S. Cl.
USPC .................. 96/134; 96/131; 96/132; 96/135; 96/150; 96/151; 95/134; 95/135; 95/136; 95/137; 422/169; 422/173; 423/242.1

(58) Field of Classification Search
USPC .............. 95/134–137; 96/131, 132, 134, 135, 96/150, 151; 422/169, 173; 423/242.1
See application file for complete search history.

(56) References Cited

U.S. PATENT DOCUMENTS

| 5,674,459 A | 10/1997 | Gohara et al. |
| 6,953,494 B2* | 10/2005 | Nelson, Jr. ...................... 95/134 |
| 8,025,860 B1* | 9/2011 | Diamond ...................... 423/210 |
| 2005/0238549 A1 | 10/2005 | Hammel |

(Continued)

FOREIGN PATENT DOCUMENTS

| DE | 36 42 179 A1 | 6/1988 |
| DE | 10 2008 009 129 A1 | 8/2009 |
| EP | 0 657 694 A2 | 6/1995 |
| EP | 1 955 758 A1 | 8/2008 |
| JP | 60-225624 A | 11/1985 |

(Continued)

OTHER PUBLICATIONS

Kassebohm et al, "Realislerung Einer Weitergehenden Rauchgasreinigung Durch Einsatz Von Koks", VGB Kraftwerkstechnik, Aug. 1990, pp. 674-680, vol. 70, No. 8 (seven (7 sheets).

(Continued)

*Primary Examiner* — Christopher P Jones
(74) *Attorney, Agent, or Firm* — Crowell & Moring LLP (57) ABSTRACT

The present invention discloses a carbon dioxide capture power generation system provided with a boiler to combust a fuel in the oxygen atmosphere, a carbon dioxide capture equipment to remove carbon dioxide in the wake flow of the boiler, a piping branching from the wake flow of the boiler to recycle the combustion exhaust gas to the boiler, and a desulfurization equipment to remove sulfur oxides and a sulfuric acid removal equipment to remove a sulfuric acid gas in the upstream of carbon dioxide capture equipment and in the wake flow of the boiler.

11 Claims, 6 Drawing Sheets

U.S. PATENT DOCUMENTS

| | | |
|---|---|---|
| 2006/0147356 A1 | 7/2006 | Sadakata et al. |
| 2009/0013871 A1* | 1/2009 | Darde et al. ............... 95/129 |
| 2009/0277363 A1* | 11/2009 | Shibata et al. ............ 110/186 |
| 2010/0206202 A1* | 8/2010 | Darde et al. ............... 110/204 |
| 2011/0014578 A1 | 1/2011 | Rohde et al. |
| 2011/0020205 A1 | 1/2011 | Kawamura et al. |

FOREIGN PATENT DOCUMENTS

| | | |
|---|---|---|
| JP | 3068888 B2 | 5/2000 |
| JP | 2001-198432 A | 7/2001 |
| JP | 2002-45643 A | 2/2002 |
| JP | 2008-36554 A | 2/2008 |
| WO | WO 2009/043108 A1 | 4/2009 |
| WO | WO 2009/116183 A1 | 9/2009 |

OTHER PUBLICATIONS

Eicken et al., "Braunkohlenkoks Zur Rauchgasreinigung Und Reststoffminimierung Von Abfallverbrennungsanlagen" BWK Brennstoff Warme Kraft, Oct. 1990, pp. R37, R38, R41, R42, R45, R46, and R49, vol. 42, No. 10 (seven (7 sheets).

European Search Report dated Sep. 9, 2011 (four (4) sheets).

Japanese Office Action dated Jan. 4, 2012 (three (3) pages).

* cited by examiner

CARBON DIOXIDE CAPTURE POWER GENERATION SYSTEM

BACKGROUND OF THE INVENTION

The present invention relates to removal of sulfuric acid in a combustion exhaust gas which is required in a carbon dioxide capture power generation system.

Recently, global warming is attracting attention as a global environmental issue. It has become clear that the increase of carbon dioxide concentration in the atmosphere is the main factor of the global warming, and reduction of carbon dioxide emission has become important.

Coal thermal power stations are dominant emission sources of carbon dioxide, and high-efficiency separation and capture of the carbon dioxide in the combustion exhaust gas have become a subject to be challenged.

In the conventional coal thermal power generation, fuel is combusted using air, and the air contains an about 80% of nitrogen which is not involved in the combustion, and this nitrogen has been a disincentive for the high-efficiency separation and capture of carbon dioxide.

In order to remove this disincentive, JP-3068888, for example describes a method in which coal is combusted with oxygen. By combusting with oxygen which contains no nitrogen, the concentration of the carbon dioxide in the combustion exhaust gas can be increased so as to allow the high-efficient separation and capture of carbon dioxide.

On the other hand, since the temperature of the combustion exhaust gas becomes high in the combustion with oxygen, in order to prevent boiler materials from becoming intolerable against the temperature, a part of the combustion exhaust gas is recycled to the boiler to decrease oxygen concentration, and thereby the temperature of the combustion exhaust gas is maintained at a level similar to the case of the combustion with air.

Since when coal is combusted in a boiler, nitrogen oxides (hereinafter, referred to as NOx) and sulfur oxides (hereinafter, referred to as SOx) are generated, equipments to purify these oxides are installed in the wake flow of the boiler. The NOx is converted to nitrogen by being reacted with ammonia using a denitration catalyst. The SOx is reacted with caustic lime to form gypsum. In addition, a part of the SOx becomes a sulfuric acid gas. When the temperature of the combustion exhaust gas becomes the sulfuric acid dew point or lower, the acid liquefies and generates sulfuric acid mist. This sulfuric acid mist adheres to members of the equipment and pipings to cause corrosion of the members. Further, the sulfuric acid mist generates white smoke when discharged through a stack, causing visual pollution. Furthermore, the sulfuric acid mist becomes a source of acid rain. Due to these reasons, an equipment to remove sulfuric acid in the combustion exhaust gas is installed.

Method to remove sulfuric acid mist includes, for example, a method of JP-A-2002-45643 is described, in which a wet electrostatic precipitator is provided in the wake flow of a desulfurization equipment to make the sulfuric acid mist charged to remove it and the sulfuric acid mist is coarsened to improve the removal performance.

SUMMARY OF THE INVENTION

The carbon dioxide in the combustion exhaust gas is separated from non-condensable gases and captured by compressing and cooling the combustion exhaust gas to liquefy the carbon dioxide. The cooling temperature becomes about $-80°$ C. or lower.

The sulfuric acid removal method in JP-A-2002-45643 is that the sulfuric acid obtained by liquefying the sulfuric acid gas to mist at the sulfuric acid dew point or lower is removed. In this method, a sulfuric acid gas corresponding to its saturated vapor pressure remains in the combustion exhaust gas. Since the saturated vapor pressure of the sulfuric acid gas decreases with temperature, the sulfuric acid gas liquefies as the gas is cooled down. In particular, in a carbon dioxide capture equipment, since the gas is cooled down to $-80°$ C. or lower, the sulfuric acid gas liquefies during cooling, adheres to the members of the equipment, and causes the corrosion of the members. This acts as a hindrance to continuous running of the carbon dioxide capture equipment. In order to prevent this, it is required that the sulfuric acid gas in the combustion exhaust gas is removed at the temperature at which the carbon dioxide capture equipment is used, to a concentration at which the sulfuric acid gas does not liquefy, in an upstream of the carbon dioxide capture equipment. An object of the present invention is to provide such method.

In order to solve the aforementioned problem, the present invention employed a carbon dioxide capture power generation system provided with a boiler in which fuel is combusted in the oxygen atmosphere, a carbon dioxide capture equipment to remove the carbon dioxide in the wake flow of the boiler, a piping branching from the wake flow of the boiler to recycle the combustion exhaust gas to the boiler, a desulfurization equipment to remove sulfur oxides, and a sulfuric acid removal equipment to remove the sulfuric acid in the upstream of the carbon dioxide capture equipment and in the wake flow of the boiler.

Since the sulfuric acid gas in the combustion exhaust gas is removed in a state of gas, the liquefaction of the sulfuric acid in the carbon dioxide capture equipment where the temperature of the combustion exhaust gas becomes lowest can be prevented, and thereby the corrosion of the members by long run can be prevented.

DETAILED DESCRIPTION OF THE EMBODIMENTS

The present embodiment employed a carbon dioxide capture power generation system provided with a boiler in which fuel is combusted in the oxygen atmosphere, a carbon dioxide capture equipment which removes the carbon dioxide in the wake flow of the boiler, a piping branching from the wake flow of the boiler to recycle the combustion exhaust gas to the boiler, a desulfurization equipment to remove sulfur oxides and a sulfuric acid removal equipment to remove the sulfuric acid in the upstream of the carbon dioxide capture equipment and in the wake flow of the boiler.

In addition, in the carbon dioxide capture generation system provided with a boiler in which fuel is combusted in the oxygen atmosphere, the desulfurization equipment to remove sulfur oxides in the wake flow of the boiler, a dehydration equipment in the wake flow of the desulfurization equipment, the carbon dioxide capture equipment to remove the carbon dioxide in the wake flow of the dehydration equipment, and a piping branching from the wake flow of the boiler and being connected to the boiler to recycle the combustion exhaust gas, the sulfuric acid removal equipment to remove the sulfuric acid gas was provided in the wake flow of the branch point to recycle the combustion exhaust gas to the boiler.

If the sulfuric acid gas liquefies in the dehydration equipment to cool down and remove moisture in the combustion exhaust gas, the sulfuric acid is mixed with liquefied water resulting in corrosion of members of the dehydration equipment. Therefore, the sulfuric acid removal equipment was provided in the upstream of the dehydration equipment.

The sulfuric acid removal equipment employed a method to remove the sulfuric acid in a gas state by inserting a sulfuric acid adsorbent in the equipment. The sulfuric acid adsorbent was used in a powder form or in a blocky form. In addition, as the sulfuric acid adsorbent, activated carbon, biomass fuel or coal was used. By doing so, the sulfuric acid adsorbent after adsorbing the sulfuric acid was used as a fuel, and the used sulfuric acid adsorbent was effectively utilized so as to avoid the sulfuric acid adsorbent becoming a waste.

Mercury is contained in the combustion exhaust gas. A mercury gas also liquefies by lowering temperature in the same manner as the sulfuric acid gas does, and adheres to the members of the equipment causing the corrosion of the members. The activated carbon, biomass fuel, or coal of the sulfuric acid adsorbent can also adsorb the mercury gas contained in the combustion exhaust gas. However, since the sulfuric acid adsorbent containing adsorbed sulfuric acid is deteriorated in the adsorption ability of the mercury gas, a mercury adsorption equipment was separately provided in the wake flow of the sulfuric acid removal equipment.

In addition, since the adsorption ability of the sulfuric acid adsorbent saturates in due course, the adsorbed sulfuric acid adsorbent is required to be replaced with unused sulfuric acid adsorbent. A piping to charge the sulfuric acid adsorbent and another piping to discharge it were connected to the sulfuric acid removal equipment, and a valve was provided to each piping. Further, a sulfuric acid concentration measuring instrument was provided at an exit of the combustion exhaust gas in the sulfuric acid removal equipment, and a control unit was also provided to read a measured value and open the charging and discharging valves when the sulfuric acid concentration becomes equal to or over a predetermined value.

In addition, the present invention employed the carbon dioxide capture power generation system provided with a boiler to combust a fuel in the oxygen atmosphere, a desulfurization equipment to remove sulfur oxides in the wake flow of the boiler, a dehydration equipment to remove moisture in the wake flow of the desulfurization equipment, a carbon dioxide capture equipment to remove the carbon dioxide in the wake flow of the dehydration equipment, a piping branching from the wake flow of the boiler to recycle the combustion exhaust gas to the boiler, and the sulfuric acid removal equipment to remove the sulfuric acid gas in the upstream of said dehydration equipment.

In the carbon dioxide capture power generation system which combusts the fuel in the oxygen atmosphere and captures the carbon dioxide efficiently, if the sulfuric acid gas is contained in the combustion exhaust gas, the sulfuric acid gas liquefies at the sulfuric acid dew point or lower, adheres to members of the equipment resulting in the corrosion of the members. Conventionally, the sulfuric acid gas has been liquefied and atomized at the sulfuric acid dew point or lower, then removed, for example, using a wet electrostatic precipitator. However, a portion of the sulfuric acid gas, corresponding to the saturated vapor pressure of sulfuric acid gas at a temperature at which the wet electrostatic precipitator is used, remains as sulfuric acid gas. In the carbon dioxide capture equipment provided in the wake flow of the wet electrostatic precipitator, the temperature at which the capture equipment is used is lower than that of the wet electrostatic precipitator, so that the saturated vapor pressure decreases and the sulfuric acid gas liquefies in the cooling process. An object of the present invention is to provide a method to prevent it.

Hereinafter, embodiments of the present invention will be explained using the accompanying drawings.

Embodiment 1

Figure 1:
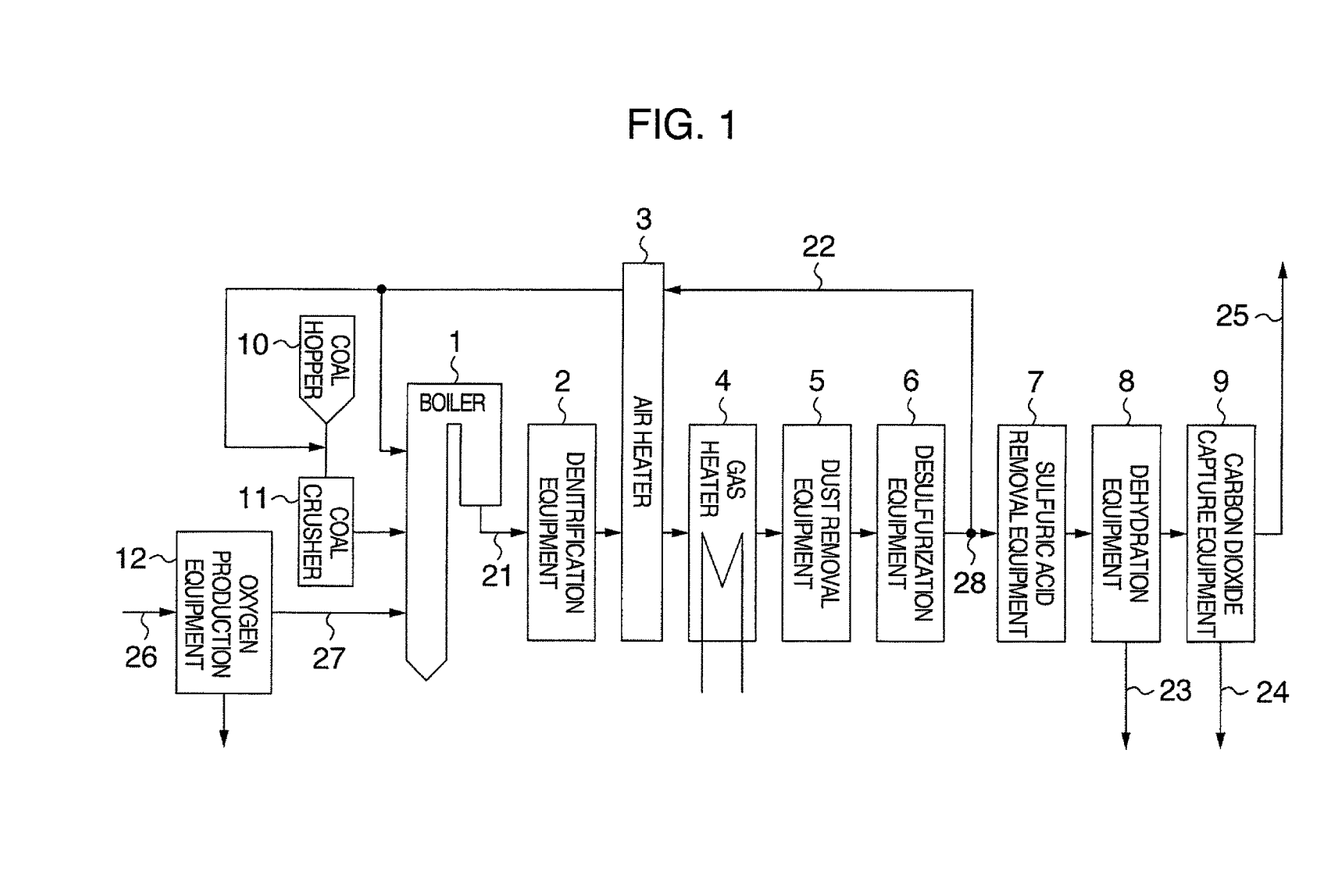
FIG. 1 is a drawing illustrating a carbon dioxide capture power generation system provided with a sulfuric acid removal equipment according to the present embodiment.

Taking a coal thermal power generation system using pulverized coal as a fuel as an example, the carbon dioxide capture power generation system according to the present invention is represented in FIG. 1. In the wake flow of a boiler 1 in which the pulverized coal is combusted, a denitrification equipment 2 to reduce the NOx to nitrogen, an air heater 3 and a gas heater 4 to recover the heat of the combustion exhaust gas, and in the wake flow of that, exhaust gas treatment equipments of a dust removal equipment 5 to remove coal ash and a desulfurization equipment 6 to remove the SOx, a sulfuric acid removal equipment 7 to remove the sulfuric acid, a dehydration equipment 8 to remove water, and a carbon dioxide capture equipment 9 to capture carbon dioxide are provided.

An oxygen production equipment 12 takes in air 26, produces oxygen 27, and supplies the oxygen 27 to the boiler 1. Coal transferred from a coal hopper 10 storing the coal is pulverized by a coal crasher 11, supplied to the boiler 1 as pulverized coal, and combusted with oxygen. When the coal is combusted with the oxygen, main components of the combustion exhaust gas become the carbon dioxide and water, and the concentration of the carbon dioxide can be made as high as 90% or more by removing the water. On the other hand, when coal is combusted with air, since nitrogen amounting to about 80% of the air is not involved in combustion, it remains in the combustion exhaust gas as it is, and the concentration of the carbon dioxide generated by the combustion becomes as low as around 10%. Therefore, by combusting with oxygen, the concentration of the carbon dioxide can be increased, and the carbon dioxide can be efficiently captured.

The combustion exhaust gas is aerated into the dehydration equipment 8, cooled down to remove water 23, then compressed and cooled down in the carbon dioxide capture equipment 9, and separated to carbon dioxide 24 and non-condensable gases 25 to capture the carbon dioxide 24.

Since when pulverized coal is combusted with a high concentration of oxygen, the temperature of the combustion exhaust gas goes up to or over an allowable temperature limit of the members constituting the boiler 1, the temperature of the combustion exhaust gas is lowered by recycling a part of the combustion exhaust gas and decreasing the oxygen concentration. In FIG. 1, a circulating gas 22 is turned back to the boiler from a branch point 28 in the wake flow of desulfurization equipment 6.

In the desulfurization equipment 6, a wet desulfurization system is employed in which slurry of caustic lime is formed and the slurry is sprayed. By spraying the caustic lime slurry, the SOx in the combustion exhaust gas is absorbed and removed by forming gypsum. The wet desulfurization has advantages that the removal rate for the SOx can be made as high as 98% or more, and further that the gypsum formed can be utilized effectively.

By the spray of caustic lime slurry, the temperature of the combustion exhaust gas is lowered. The circulating gas 22, since it is passed through the desulfurization equipment 6 and its temperature is about 50° C., is heated up by the air heater 3 and supplied to the boiler 1. By doing so, the heat efficiency of the boiler can be improved.

A part of the SOx in the combustion exhaust gas is oxidized to the sulfuric acid gas. The combustion exhaust gas, when cooled down to the sulfuric acid dew point or lower, liquefies to sulfuric acid mist. This sulfuric acid mist adheres to the members of equipment and causes the corrosion of the members.

Figure 2:
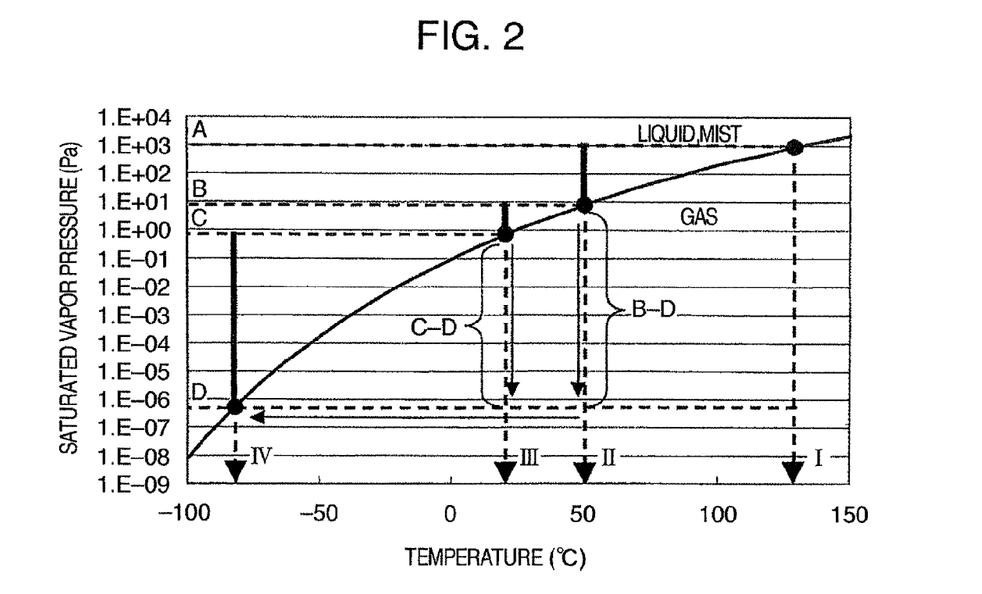
FIG. 2 is a graph representing the saturated vapor pressure curve of sulfuric acid according to the present embodiment.

In FIG. 2, a saturated vapor pressure curve of the sulfuric acid gas of the present embodiment is represented. The sulfuric acid gas is a hydrate of 100% sulfuric acid, and a saturated vapor pressure curve of 90% sulfuric acid and 10% water is represented as an example of the sulfuric acid mist composition. Though the sulfuric acid dew point at which the sulfuric acid gas liquefies varies depending on the sulfuric acid gas concentration and the water concentration, it is assumed here to be 130° C. at I in FIG. 2. When the temperature of the combustion exhaust gas is lowered to 130° C., the sulfuric acid liquefies. On the other hand, a sulfuric acid gas corresponding to the saturated vapor pressure of A in FIG. 2 remains in the combustion exhaust gas. Due to the desulfurization equipment 6, the temperature of the combustion exhaust gas is lowered to 50° C. at II in FIG. 2, and the saturated vapor pressure is lowered to B in FIG. 2. Accordingly, in the desulfurization equipment 6, the sulfuric acid corresponding to the vapor pressure difference A–B liquefies. Similarly, if the cooling temperature in the dehydration equipment 8 is 20° C. at III in FIG. 2, the sulfuric acid corresponding to the vapor pressure difference B–C liquefies, and also if the cooling temperature in the carbon dioxide capture equipment 9 is −80° C., the sulfuric acid corresponding to the vapor pressure difference C–D liquefies.

Consequently, in the method in which the sulfuric acid is removed in a state of sulfuric acid mist, since a portion of sulfuric acid gas corresponding to its saturated vapor pressure remains in the combustion exhaust gas, the sulfuric acid gas liquefies when cooled down further. Therefore, in equipments to be used at the sulfuric acid dew point or lower, the liquefied sulfuric acid adheres to the members. In the desulfurization equipment 6, since the members are washed with the sprayed caustic lime slurry, the corrosion of the members can be prevented. However, in the dehydration equipment 8 and the carbon dioxide capture equipment 9, the corrosion of the members cannot be prevented because no liquid is used to wash the members.

Consequently, in the present embodiment, a method in which the sulfuric acid gas is removed in a gas state instead of a liquid state has been employed. In the sulfuric acid removal equipment 7 in FIG. 1, a sulfuric acid adsorbent to adsorb the sulfuric acid gas is inserted.

The insertion of the sulfuric acid adsorbent to adsorb the sulfuric acid gas will be explained using the saturated vapor pressure curve of sulfuric acid gas in FIG. 2. If the cooling temperature in the carbon dioxide capture equipment 9 is −80° C., the sulfuric acid corresponding to the vapor pressure difference C–D liquefies. However, by providing the sulfuric acid removal equipment 7 in the downstream side of the dehydration equipment 8, the sulfuric acid corresponding to the vapor pressure difference C–D or more is removed in advance. By this, the carbon dioxide can be captured without the liquefaction of the sulfuric acid gas in the carbon dioxide capture equipment 9, and with preventing the corrosion of the members. In addition, by providing the sulfuric acid removal equipment 7 in the downstream side of the desulfurization equipment 6, the sulfuric acid gas corresponding to the vapor pressure difference B–D or more is removed in advance. By this, carbon dioxide can be captured without the liquefaction of the sulfuric acid gas in the dehydration equipment 8 and the carbon dioxide capture equipment 9, and with preventing the corrosion of the members. Thus, when the sulfuric acid gas remains at the saturated vapor pressure at A in FIG. 2 in the combustion exhaust gas, after the sulfuric acid gas corresponding to the vapor pressure difference A–B of the saturated vapor pressure is removed by the desulfurization equipment 6, the sulfuric acid gas corresponding to the vapor pressure difference B–D or C–D or more in a state of sulfuric acid gas under the saturated vapor pressure curve is removed in the upstream of the carbon dioxide capture equipment 9. The sulfuric acid removal equipment 7 is provided by calculating the amount of sulfuric acid gas to be removed based on the temperature and pressure obtained from this saturated vapor pressure curve of the sulfuric acid gas according to the equation of state of gas, then calculating the amount of sulfuric acid adsorbent to be required from the amount of sulfuric acid gas to be removed and the removal capability of the adsorbent.

Since the combustion exhaust gas 21 diverges to the circulating gas 22 at a branch point 28, the volume of the combustion exhaust gas decreases in the wake flow of the branch point 28. Therefore, the sulfuric acid removal equipment 7 is desirably provided in the wake flow of the branch point 28, and thereby the sulfuric acid removal equipment 7 can be downsized.

Although the branch point 28 is provided between the desulfurization equipment 6 and the sulfuric acid removal equipment 7 in FIG. 1, the branch point may be provided between the dust removal equipment 5 and the desulfurization equipment 6, or may be provided between the gas heater 4 and the dust removal equipment 5.

Further, the sulfuric acid removal equipment 7 is desirably provided in the upstream of the dehydration equipment 8. Even the combustion exhaust gas is cooled down in the dehydration equipment 8, it can be avoided that the sulfuric acid gas liquefies in the dehydration equipment 8 by removing the sulfuric acid gas in the sulfuric acid removal equipment 7 so that the vapor pressure of the sulfuric acid gas becomes equal to or below the saturated vapor pressure at that temperature.

The sulfuric acid adsorbent to adsorb the sulfuric acid gas is a solid material such as caustic lime, hydrated lime or activated carbon, and it is the form of powder or block. Since the sulfuric acid adsorbent is used in a dry state, the absorbent can adsorb not only the sulfuric acid gas but the sulfuric acid mist which is formed by the liquefaction of the sulfuric acid gas.

When the powder form of sulfuric acid adsorbent is used, since the sulfuric acid adsorbent flows out in the wake flow by being entrained with the combustion exhaust gas, a dust removal equipment is required to capture the sulfuric acid adsorbent which was flowed out. In addition, it is important to reuse the sulfuric acid adsorbent by recharging the captured sulfuric acid adsorbent into the sulfuric acid removal equipment as an effective utilization of the sulfuric acid adsorbent.

Therefore, the sulfuric acid removal equipment 7 is desirably a circulating fluidized bed equipment having functions of the capture and the recharge of the sulfuric acid adsorbent.

When the block form of sulfuric acid adsorbent is used, the sulfuric acid removal equipment becomes a packed bed equipment. Although the sulfuric acid adsorbent does not flow out in the wake flow by being entrained with the combustion exhaust gas, it is necessary to secure a certain height of packed bed to gain contact area with the combustion exhaust gas. In addition, since the adsorption ability is decreased earlier and further the absorbent earlier reaches a state of adsorption equilibrium in the upper stream of the packed bed, it becomes necessary to take out the sulfuric acid adsorbent in the upper stream and charge the absorbent to make up for the deficiency from the lower stream.

As described above, by using the carbon dioxide capture power generation system provided with the boiler in which fuel is combusted in the oxygen atmosphere, the carbon dioxide capture equipment to remove the carbon dioxide in the wake flow of the boiler, the piping branching from the wake flow of the boiler to recycle the combustion exhaust gas to the boiler, and the desulfurization equipment to remove the sulfur oxides and the sulfuric acid removal equipment to remove the sulfuric acid gas in the upstream of the carbon dioxide capture equipment and in the wake flow of the boiler, the sulfuric acid gas in the combustion exhaust gas can be removed up to the concentration under which the sulfuric acid gas does not liquefy at the temperature at which the carbon dioxide capture equipment is used in the upstream of the carbon dioxide capture equipment.

In addition, by using the carbon dioxide capture power generation system having the piping branching from the wake flow of the boiler to recycle the combustion exhaust gas to the boiler and provided with the aforementioned sulfuric acid removal equipment in the wake flow of the branch point to recycle the combustion exhaust gas to the boiler, the corrosion of the members can be prevented while the liquefaction of the sulfuric acid gas in the carbon dioxide capture equipment is avoided, as well as the sulfuric acid removal equipment can be downsized.

In addition, by using the carbon dioxide capture power generation system having the dehydration equipment to remove moisture in the wake flow of the desulfurization equipment and provided with the sulfuric acid removal equipment in the upstream of the dehydration equipment, the liquefaction of the sulfuric acid gas in the dehydration equipment can be avoided.

Embodiment 2

Although the used sulfuric acid adsorbent becomes a waste, if the adsorbent is of same carbonaceous one such as coal, like activated carbon, the adsorbent can be used as a fuel instead of becoming a waste.

Further, since the sulfuric acid adsorbed by the sulfuric acid adsorbent is emitted in the combustion exhaust gas as the SOx instead of the sulfuric acid gas by high-temperature combustion at 1,000° C. or higher, it does not result in an increase of the concentration of the sulfuric acid gas. In addition, since the concentration of the sulfuric acid gas in the combustion exhaust gas is as low as several % of the SOx concentration, an extreme increase of the SOx concentration is not avoided.

As mentioned above, the sulfuric acid adsorbent is desirably the carbonaceous one, and coal, which is a fuel, can be used in the coal thermal power generation system. Further, since mixed combustion of coal and biomass has been implemented in the coal thermal power generation, the biomass fuel can be also used as the sulfuric acid adsorbent.

When the sulfuric acid adsorbent is in a form of fine particles like pulverized coal, a circulation fluidized bed equipment may be used for the sulfuric acid removal equipment, and when the absorbent is block coal, the packed bed equipment may be used for the sulfuric acid removal equipment.

Figure 3:
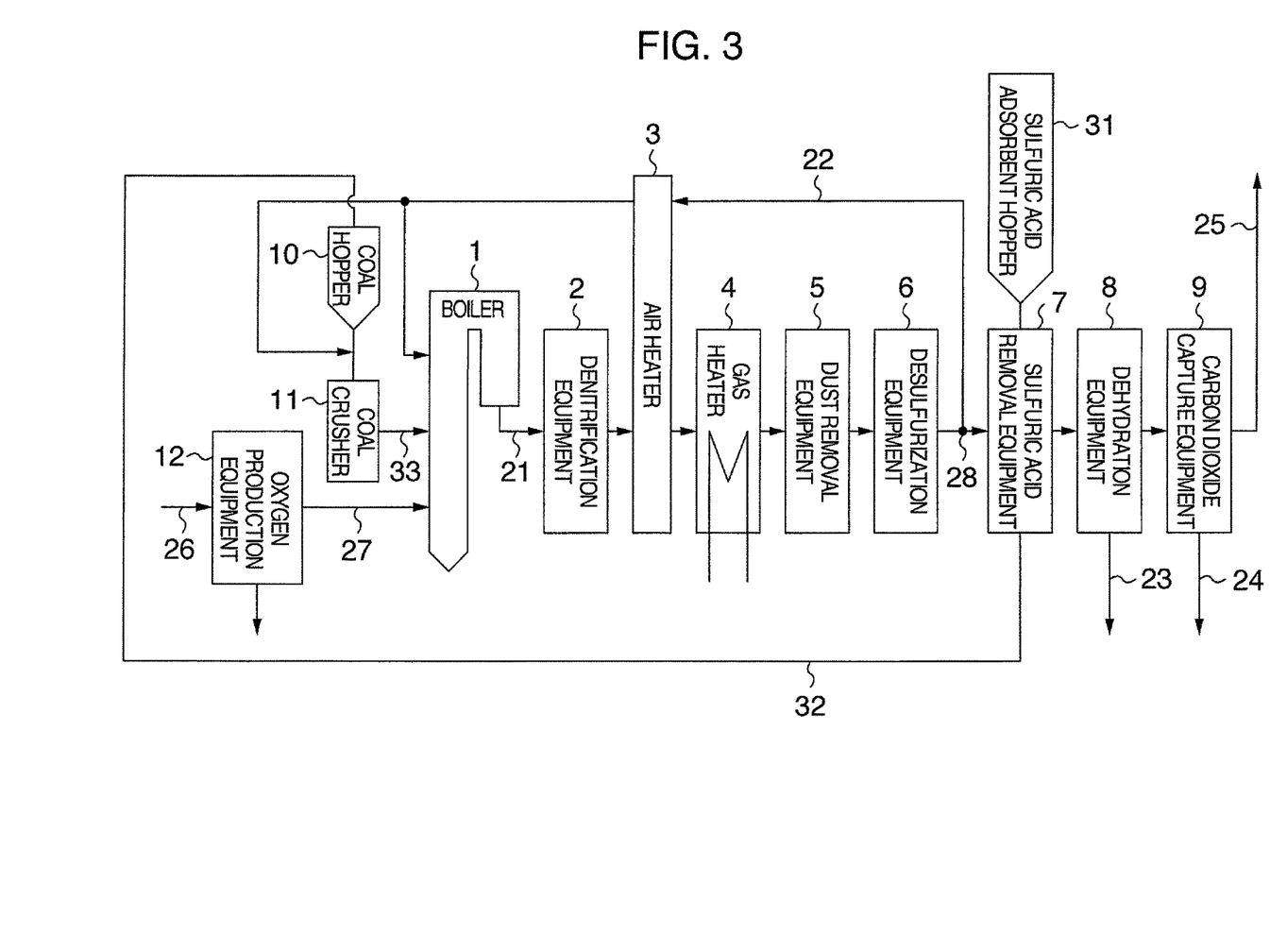
FIG. 3 is a drawing illustrating a carbon dioxide capture power generation system using a sulfuric acid adsorbent as a fuel according to the present embodiment.

In FIG. 3, a carbon dioxide capture power generation system using the sulfuric acid adsorbent according to the present invention as a fuel is represented. A sulfuric acid adsorbent hopper 31 is connected to the sulfuric acid removal equipment 7 so that the sulfuric acid adsorbent can be charged when needed.

When the sulfuric acid adsorbent is block coal, the block coal of the absorbent is transported to the coal hopper 10 in which the block coal is stored through a sulfuric acid adsorbent transporting pipe 32, converted to pulverized coal by a coal crusher 11, and then used as a fuel. When the sulfuric acid adsorbent is the pulverized coal, the absorbent may be made to join a pulverized coal transporting pipe 33 together, and supplied to the boiler 1.

As mentioned above, by using the activated carbon, biomass or coal as the sulfuric acid adsorbent, the sulfuric acid adsorbent after adsorbing the sulfuric acid can be used as a fuel for the boiler, and the used sulfuric acid adsorbent can be effectively utilized avoiding the sulfuric acid adsorbent becoming a waste.

Embodiment 3

The combustion exhaust gas of coal contains mercury gas. The mercury gas also liquefies by a decrease in temperature in the same way as sulfuric the acid gas does, and adheres to the members of equipments to cause the corrosion of the members.

Since the activated carbon, coal or biomass fuel of the sulfuric acid adsorbent can also adsorb the mercury gas in the combustion exhaust gas, the absorbent can prevent liquefaction of the mercury in the equipment in the wake flow of the sulfuric acid removal equipment, for example, in the carbon dioxide capture equipment which is cooled down to −80° C. or lower to protect the equipment members.

However, the sulfuric acid adsorbent containing adsorbed sulfuric acid deteriorates in the adsorption ability for the mercury gas. In particular, when the sulfuric acid adsorbent adsorbs the sulfuric acid mist in a liquid state, the adsorption ability for the mercury gas deteriorates extremely, because the surface of the sulfuric acid adsorbent is covered with liquid. Therefore, an equipment is required to remove the mercury gas which cannot be removed in the sulfuric acid removal equipment.

Figure 4:
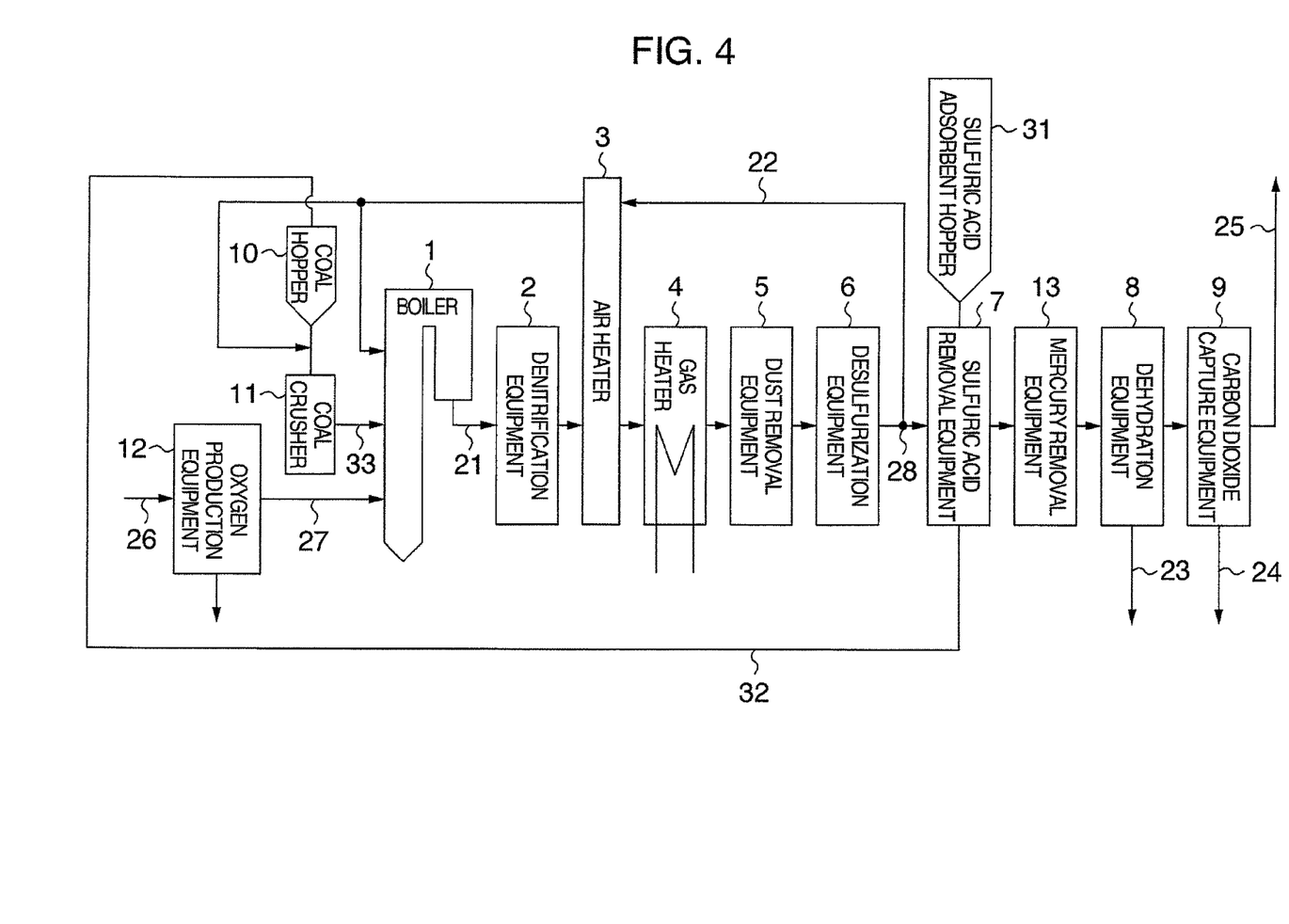
FIG. 4 is a drawing illustrating a carbon dioxide capture power generation system provided with a sulfuric acid removal equipment and a mercury removal equipment according to the present embodiment.

In FIG. 4, the carbon dioxide capture power generation system provided with the sulfuric acid removal equipment and a mercury removal equipment according to the present embodiment is represented. A mercury removal equipment 13 was provided in the wake flow of the sulfuric acid removal equipment 7. The mercury removal equipment 13 is located in the wake flow of the branch point 28 from where the combustion exhaust gas is circulated to reduce the gas volume in the same manner as in the sulfuric acid removal equipment, and thereby can be downsized.

In the mercury gas in the combustion exhaust gas, a metal mercury gas and a mercury chloride gas exist. The mercury chloride gas has an adsorptive property to coal ash and is further soluble in water. The mercury chloride adsorbed on the coal ash is removed by the dust removal equipment 5, and the mercury chloride in the combustion exhaust gas is also removed by the desulfurization equipment 6. Further, the mercury chloride is also removed by activated carbon, coal or biomass fuel of the sulfuric acid adsorbent which is charged into the sulfuric acid removal equipment 7. On the other hand, the metal mercury gas has no adsorptive property to the coal ash nor solubility into the water, therefore, passes by the dust removal equipment 5 and the desulfurization equipment 6. Furthermore, adsorption to the sulfuric acid adsorbent, activated carbon, coal and biomass fuel in the sulfuric acid removal equipment 7 is less.

The mercury gas which cannot be removed by the sulfuric acid removal equipment is the metal mercury gas. Therefore, the mercury removal equipment 13 is desirably an equipment which is capable of removing the metal mercury gas. The material adsorbing the metal mercury gas includes nickel alloys, for example, SUS. The mercury gas reacts with nickel to form amalgam. It is desirable to charge the nickel alloy as an adsorbent into the mercury removal equipment.

As mentioned above, the mercury gas which cannot be removed by the sulfuric acid removal equipment can be removed by providing the mercury removal equipment in the wake flow of the sulfuric acid removal equipment.

Embodiment 4

The sulfuric acid adsorbent reaches an adsorption equilibrium or an adsorption saturation after continuing to adsorb the sulfuric acid gas, and lose the adsorptive property. Accordingly, it becomes necessary arbitrarily to replenish the unused sulfuric acid adsorbent as well as to take out the adsorbed sulfuric acid adsorbent.

Figure 5:
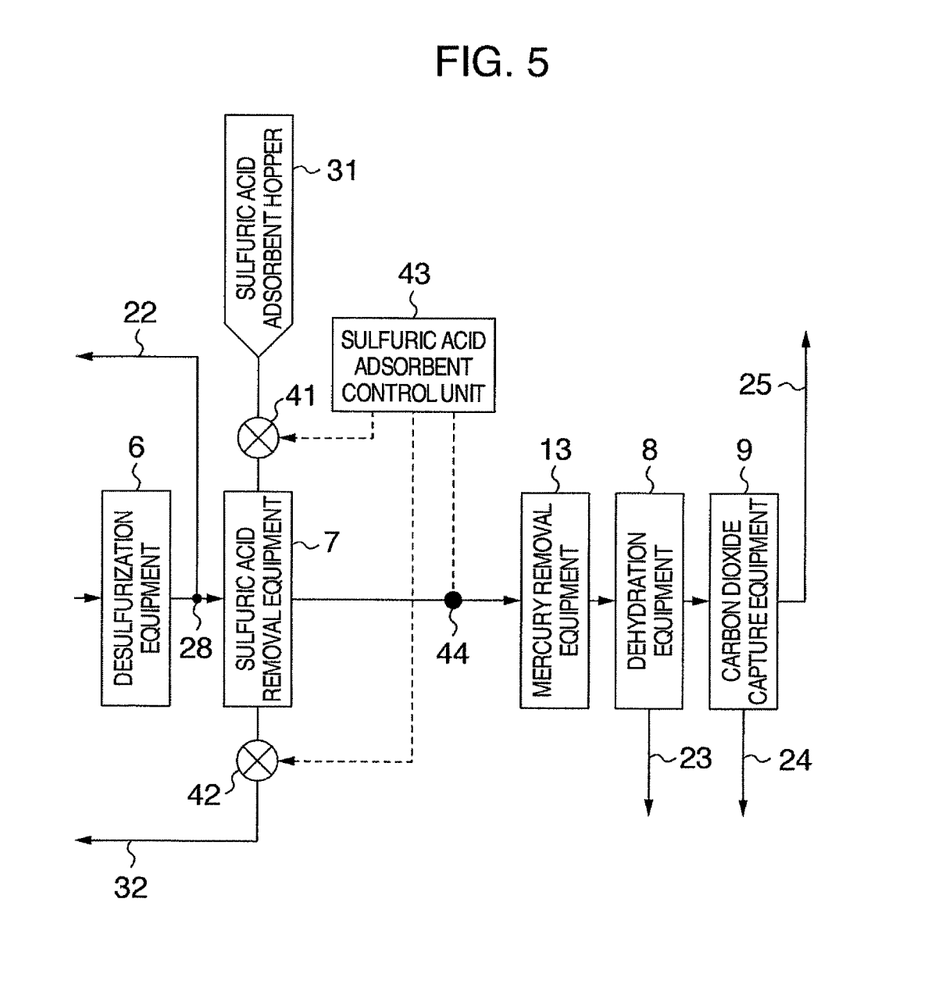
FIG. 5 is a drawing illustrating a sulfuric acid adsorbent replacing system according to the present embodiment.

In FIG. 5, a replacing system for the sulfuric acid adsorbent according to the present invention is represented. The sulfuric acid removal equipment employs a method in which the combustion exhaust gas flows upward from the bottom side of the packed bed, assuming a packed bed equipment packed with block coal. The unused sulfuric acid adsorbent is charged through a sulfuric acid adsorbent charging valve 41 located midway of a piping connected to the sulfuric acid adsorbent hopper 31 and the sulfuric acid removal equipment 7, and the sulfuric acid adsorbent containing adsorbed sulfuric acid is discharged from a sulfuric acid adsorbent discharging valve 42 located midway of the sulfuric acid adsorbent transporting piping 32 connected to the sulfuric acid removal equipment 7.

A sulfuric acid concentration measuring instrument 44 is provided at the exit of the sulfuric acid removal equipment so that the sulfuric acid concentration in the combustion exhaust gas can be measured. A sulfuric acid adsorbent control unit 43 has functions to take in a measured sulfuric acid concentration, compare the measured concentration with an upper limit concentration, and send out a signal to carry out opening/closing operation of the sulfuric acid adsorbent charging valve 41 and the sulfuric acid adsorbent discharging valve 42 when the measured concentration exceeds the upper limit concentration. The upper limit value of the sulfuric acid concentration is the concentration at which the sulfuric acid gas does not liquefy in the carbon dioxide capture equipment to be used at the lowest temperature. The upper limit concentration may be set by multiplying a safety rate, based on the saturated vapor pressure of sulfuric acid gas at the temperature at which the carbon dioxide capture equipment is used.

Figure 6:
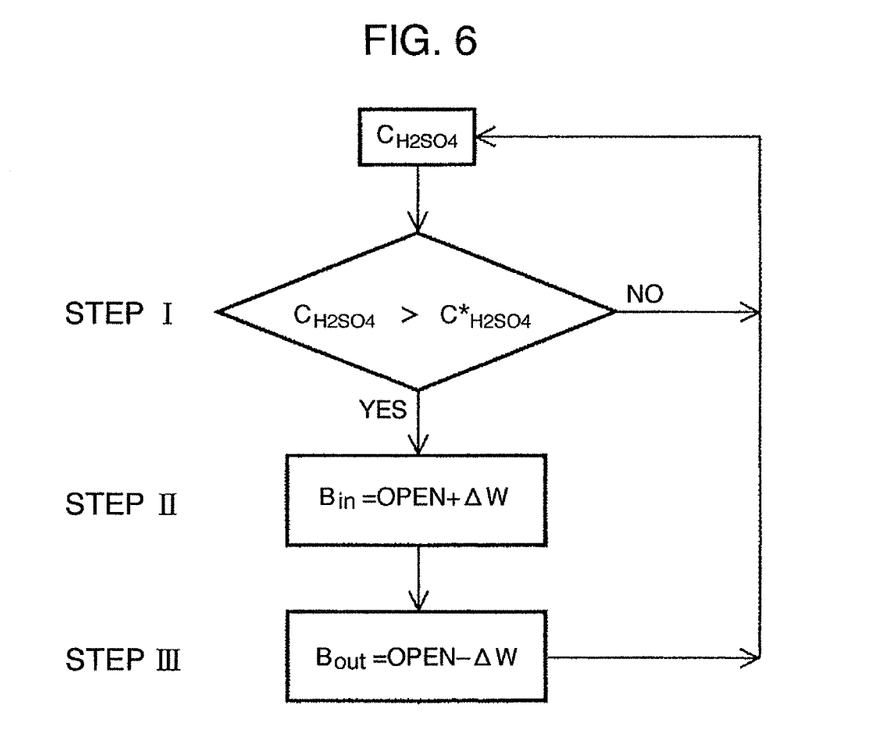
FIG. 6 is a drawing illustrating a method of the sulfuric acid adsorbent replacing system according to the present embodiment.

In FIG. 6, a replacement control method for the sulfuric acid adsorbent according to the present invention is represented. In STEP I, a sulfuric acid concentration $C_{H2HO4}$ measured by the sulfuric acid concentration measuring instrument is input, and compared with the upper limit value of the sulfuric acid concentration $C^*_{H2SO4}$. When the relation of $C_{H2HO4} < C^*_{H2SO4}$ is satisfied, the monitoring of the sulfuric acid concentration is continued, because the sulfuric acid gas does not liquefy in the carbon dioxide capture equipment.

When the adsorption ability of the sulfuric acid adsorbent is deteriorated and the relation of $C_{H2HO4} > C^*_{H2SO4}$ is satisfied, the stage proceeds to STEP II, because the sulfuric acid gas liquefies in the carbon dioxide capture equipment. The sulfuric acid adsorbent charging valve $B_{in}$ is set OPEN, and the unused sulfuric acid adsorbent is charged. Subsequently, the stage proceeds to STEP III, the sulfuric acid adsorbent discharging valve $B_{out}$ is set OPEN, and the sulfuric acid adsorbent containing the adsorbed sulfuric acid is discharged.

$+\Delta W$ is an input per one time for the sulfuric acid adsorbent. If this value is set large, the sulfuric acid adsorbent of an amount exceeding the capacity of the sulfuric acid removal equipment might be charged in STEP II. Since this might adversely affect on the aeration of the combustion exhaust gas, the $+\Delta W$ is desirably set at a value compatible to the capacity of the equipment. On the other hand, $-\Delta W$ is a discharging amount per one time for the sulfuric acid adsorbent. By making $\Delta W$ for charge and discharge equivalent, the amount of the sulfuric acid adsorbent in the equipment can be maintained constant.

The $\Delta W$ for charging and discharging are made equal by using the same rotary valves for the sulfuric acid adsorbent charging valve and the sulfuric acid adsorbent discharging valve, and making the conditions of the numbers of revolutions and operation times thereof the same. Alternatively, the $\Delta W$ for charging and discharging are made equal by providing a load cell in the sulfuric acid adsorbent hopper and the sulfuric acid removal equipment, and measuring a weight change.

By the replacing operations for the sulfuric acid adsorbent, the adsorption ability is recovered and the relation of $C_{H2HO4} < C^*_{H2SO4}$ is maintained.

As mentioned above, the adsorption ability of the sulfuric acid adsorbent can be appropriately controlled, by providing the control unit equipped with the sulfuric acid concentration measuring instrument at the exit of the combustion exhaust gas in the sulfuric acid removal equipment, reading the measured value, and opening the sulfuric acid charging valve to charge the unused sulfuric acid adsorbent, as well as opening the sulfuric acid discharging valve to discharge the sulfuric acid adsorbent containing adsorbed sulfuric acid in the sulfuric acid removal equipment, when the sulfuric acid concentration is equal to or over the prescribed value.

It should be noted that, STEP II and STEP III may be inversely sequenced depending on the situation.

The control unit mentioned above can be implemented by using a computer etc. equipped with a memory and CPU. In addition, since processings of STEPs I to III as being functions provided by the units are program modules, each function can be implemented by reading the modules and making the computer to execute. Data are stored in the memory device, which can be read in the processing. In addition, by reading a recording medium which recorded the program modules into the computer, each function of the control unit can be implemented.

It should be noted that, the present invention is not limited only to the embodiments described above, and includes various modified cases. For example, embodiments described above were explained in detail for easy understanding of the present invention, and the present invention is not necessarily limited to embodiments which comprise all the constituents described above.

The invention claimed is:

1. A carbon dioxide capture power generation system comprising:
    a boiler to combust a fuel;
    a carbon dioxide capture device to remove carbon dioxide disposed downstream of the boiler;
    a dehydration device to remove moisture disposed upstream of said carbon dioxide capture device,
    a piping branching from downstream of the boiler to recycle an exhaust gas to the boiler; and
    a desulfurization device to remove sulfur oxides from said exhaust gas and a sulfuric acid removal device to remove a sulfuric acid gas which is different from said desulfurization device, both said desulfurization device and said sulfuric acid removal device being disposed upstream of said carbon dioxide capture device and said dehydration device and downstream of the boiler;
    wherein no dehydration devices are between said desulfurization device and said sulfuric acid removal device.

2. A carbon dioxide capture power generation system according to claim 1, wherein said piping has a branch point to recycle the exhaust gas to the boiler.

3. The carbon dioxide capture power generation system according to claim 2, wherein:
    said sulfuric acid removal device is disposed downstream of the branch point.

4. The carbon dioxide capture power generation system according to claim 1, wherein said sulfuric acid removal device includes a sulfuric acid adsorbent.

5. The carbon dioxide capture power generation system according to claim 4, wherein said sulfuric acid adsorbent is in a powder form or a blocky form.

6. The carbon dioxide capture power generation system according to claim 4, wherein said sulfuric acid adsorbent includes at least one of activated carbon, biomass fuel, or coal.

7. The carbon dioxide capture power generation system according to claim 4, wherein said sulfuric acid adsorbent is removable.

8. The carbon dioxide capture power generation system according to claim 7, wherein said sulfuric acid adsorbent is a fuel for said boiler.

9. The carbon dioxide capture power generation system according to claim 8, further comprising a sulfuric acid adsorbent hopper to supply said sulfuric acid adsorbent to said sulfuric acid removal device.

10. The carbon dioxide capture power generation system according to claim 1, further comprising a mercury removal device downstream of said sulfuric acid removal device.

11. The carbon dioxide capture power generation system according to claim 1, further comprising:
    a first piping to charge the sulfuric acid adsorbent to said sulfuric acid removal device;
    a charging valve at said first piping;
    a second piping to discharge a sulfuric acid adsorbent from said sulfuric acid removal device;
    a discharging valve at said second piping;
    a sulfuric acid concentration measuring instrument at an exit of said sulfuric acid removal device; and
    a control unit controlling said charging valve and said discharging valve based on a value of said sulfuric acid concentration measuring instrument.

* * * * *